Dec. 18, 1951    R. T. TOWNSEND    2,578,952
HOLD-DOWN ATTACHMENT FOR SKINNING MACHINES
Filed Feb. 24, 1947    3 Sheets-Sheet 1
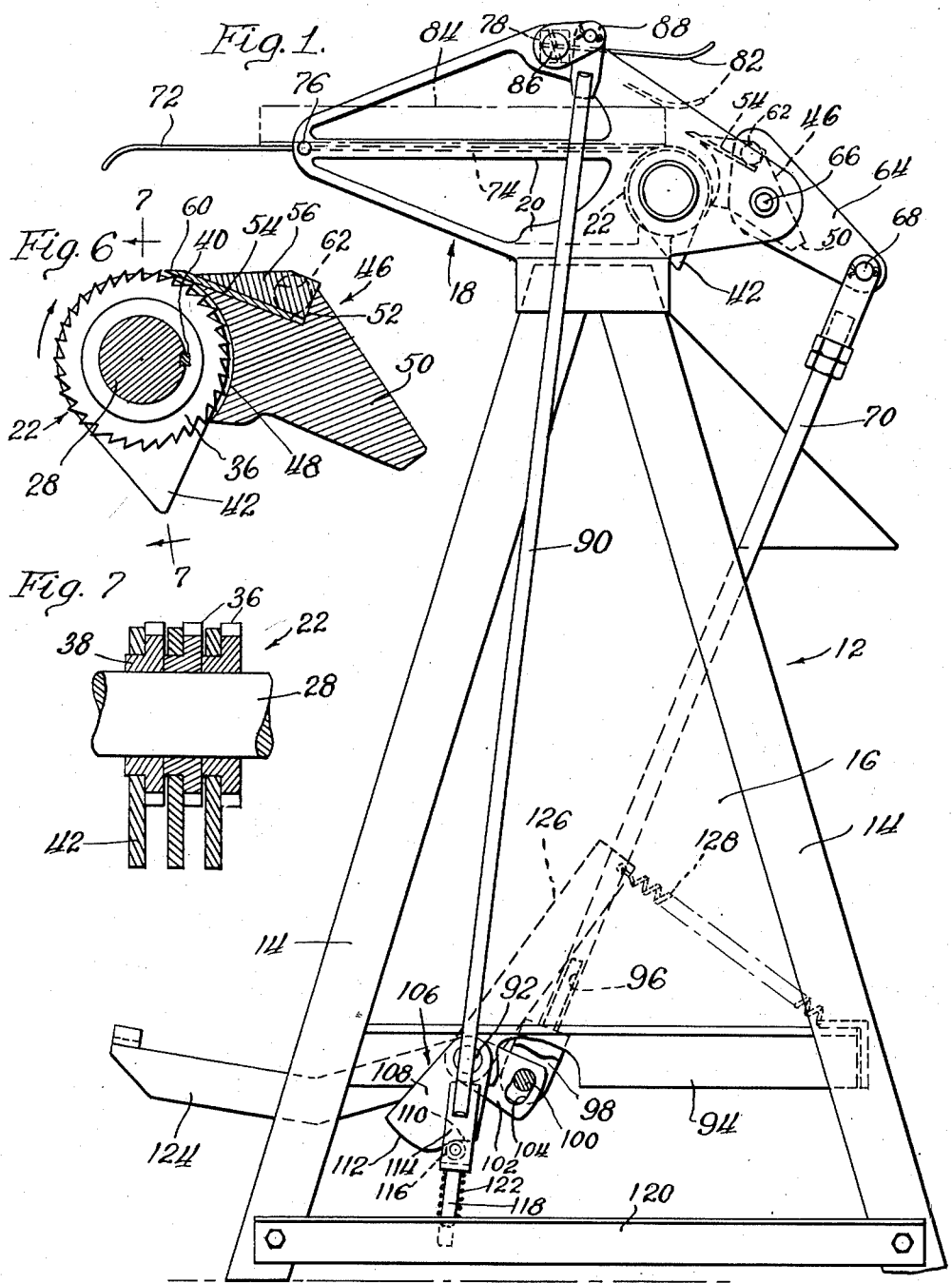
INVENTOR.
Ray T. Townsend
BY Bair & Freeman
Attys.

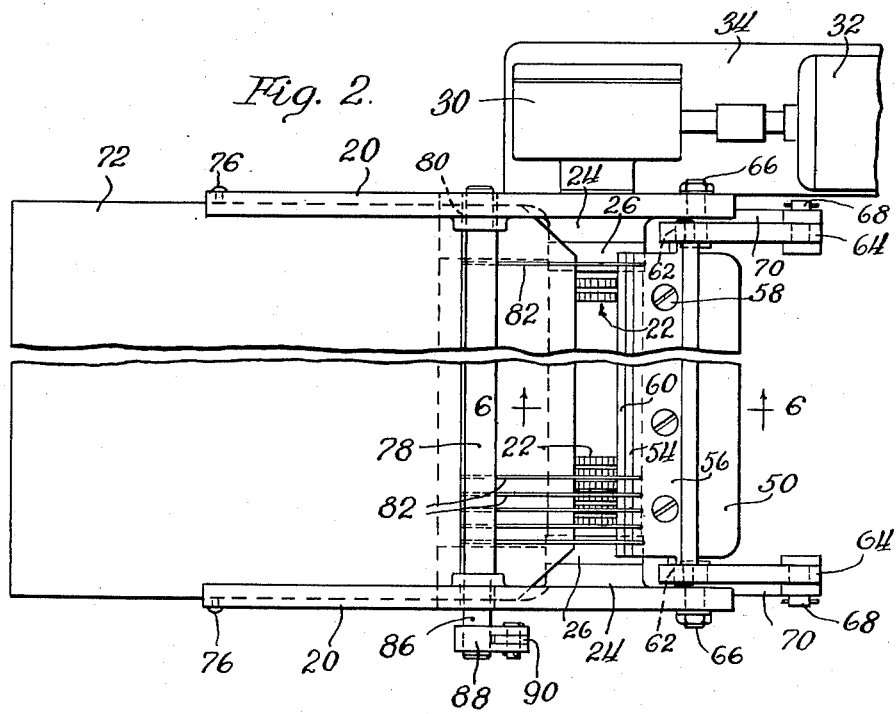
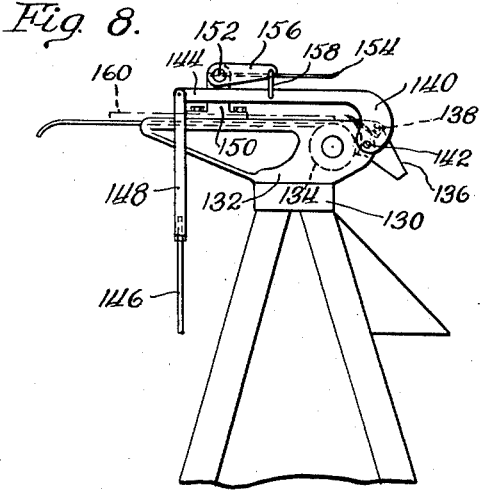
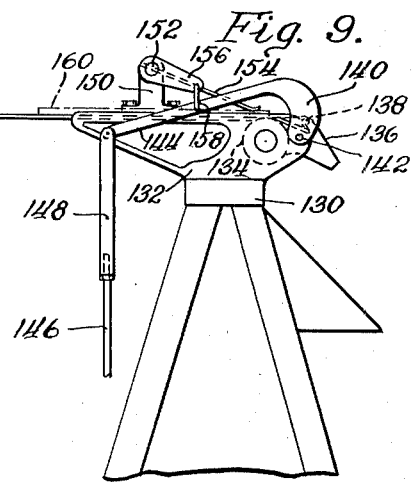

Dec. 18, 1951    R. T. TOWNSEND    2,578,952
HOLD-DOWN ATTACHMENT FOR SKINNING MACHINES
Filed Feb. 24, 1947    3 Sheets-Sheet 3
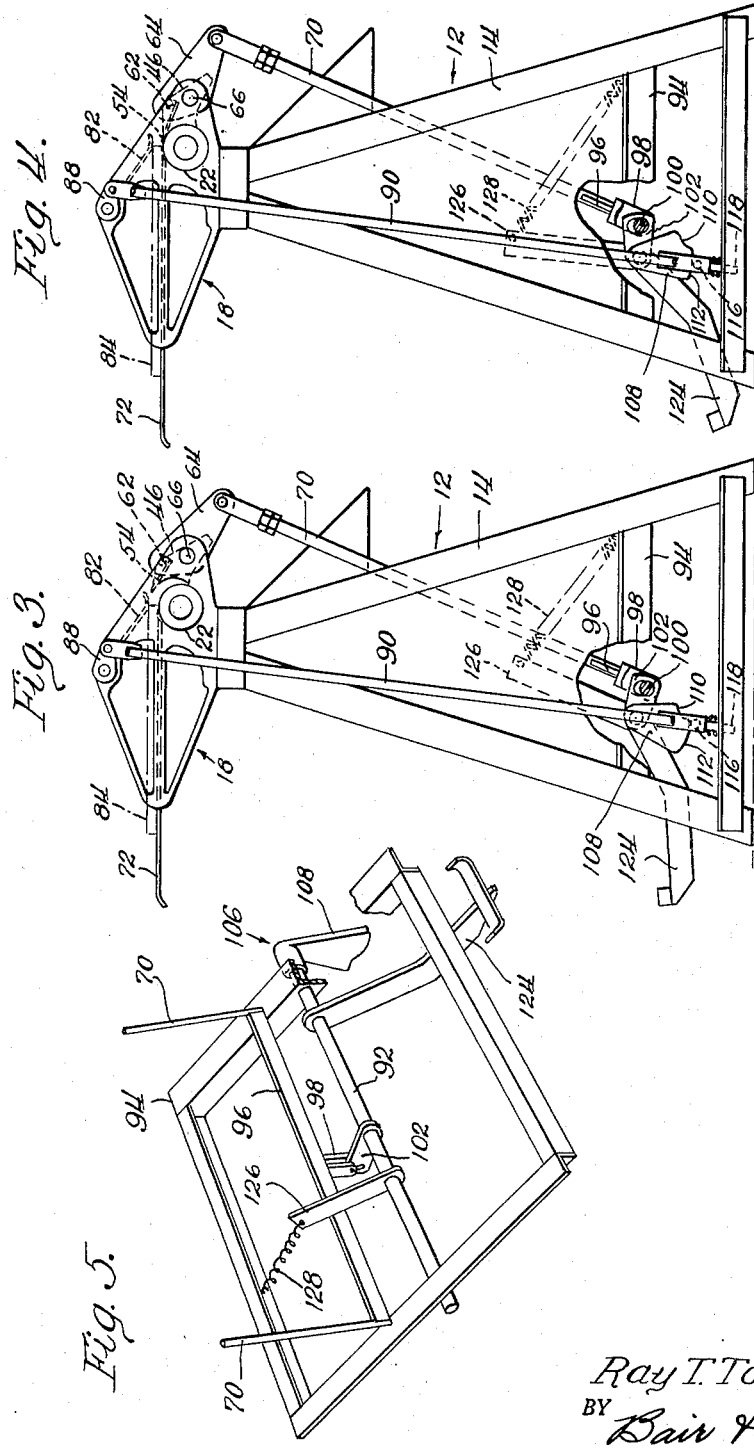

Patented Dec. 18, 1951

2,578,952

UNITED STATES PATENT OFFICE 2,578,952

HOLD-DOWN ATTACHMENT FOR SKINNING MACHINES

Ray Theodore Townsend, Des Moines, Iowa, assignor to Townsend Engineering Company, Des Moines, Iowa, a corporation of Iowa Application February 24, 1947, Serial No. 730,415

8 Claims. (Cl. 146—130)

This invention relates to an attachment for skinning machines for pork pieces.

The present invention is especially designed for use in connection with a skinning machine of the general nature disclosed in my prior applications, Serial No. 562,460, filed November 8, 1944, which became Patent No. 2,455,831 on December 7, 1948, which patent was reissued as Reissue Patent No. 23,222, and Serial No. 680,939, filed July 2, 1946, which became Patent No. 2,522,728 on September 19, 1950.

The skinning machines disclosed in my two previous applications mentioned above are particularly adaptable to skinning round pieces such as hams and shoulders. The machines are also effective in skinning flat pieces such as backs, bellies, and smoked bacons. It has been found that in the case of flat pieces it is desirable to hold the pieces flat on a supporting table when being skinned so that the skin will be held flat and smooth for more efficient skinning thereof.

It is therefore an object of the present invention to provide a hold down attachment for such skinning machines for retaining in flattened position pieces which are normally generally flat, but may tend to become wrinkled or curved, or assume other slightly different shapes.

One form of the present invention is designed to be made a part of the skinning machine in its original construction, and another form is designed as an attachment which may be added to skinning machines already in existence.

The skinning machine of my applications referred to above, and to which the device of the present invention is designed to be applied, includes a rotating roll and a concave shoe cooperating therewith, together forming a skin pulling means. The hold down attachment of the present invention is designed to hold the flat pieces against said roll.

Another object of the invention, in the preferred form thereof, is the provision of a hold down attachment which comes into contact with the pieces of meat being skinned, and holds it flat before the skin pulling means comes into operation.

A further object of the invention is the provision of such a hold down attachment which may be brought into operation in proper sequence relative to the skin-pulling means by a single movement of the operator. In the first part of such movement, the hold down attachment comes into operation, and a continuation of the same movement brings the skin-pulling means into operation.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 1 is a side view of a skinning machine embodying the device of my present invention;

Figure 2 is a plan view of the machine;

Figure 3 is a semi-diagrammatic view, similar to Figure 1, showing the hold down attachment in operative position and the skin pulling means in inoperative position;

Figure 4 is a semi-diagrammatic view similar to Figure 3 showing the hold down attachment in operative position and the skin pulling means also in operative position;

Figure 5 is a fragmentary perspective view of the bottom portion of the skinning machine employing my invention;

Figure 6 is a fragmentary sectional view taken approximately on the line 6—6 of Figure 2;

Figure 7 is a sectional view of the portion of the roller forming a part of the skin pulling means, and taken on line 7—7 of Figure 6;

Figure 8 is a semi-diagrammatic, partial view of a skinning machine employing a modified form of hold down attachment designed for application to a machine previously constructed; and Figure 9 is a view similar to Figure 8 showing the hold down attachment in operative position.

Referring now in detail to the drawings, the skinning machine to which the device of my present invention is applied includes a stand 12, having corner structural members 14, and a surrounding shield 16, forming an enclosure within the structure of the stand. A top frame member 18 is secured on the top of the stand 12 and includes a pair of side plates 20, one disposed on each side of the machine.

A skinning roller 22 is journalled in journals 24 formed on the inner sides of the side plates 20. The inner ends of the journals 24 are provided with extensions or rings 26 adjacent the ends of the roller 22, and are of slightly larger diameter than the roller. The roller 22 includes a shaft 28 (Figure 6) by which the roller is journalled, and the shaft 28 extends outwardly through one of the side plates 20 and has operative connection with a gear reduction indicated generally at 30. The gear reduction 30 is operated by a convenient motor 32, the gear reduction 30 and the motor 32 being mounted on a platform 34 secured to the frame of the machine.

Figures 6 and 7 will show the details of the construction of the roller 22. A plurality of rings 36 each having a central shoulder 38 formed on one side thereof are fitted together on the shaft 28. The rings 36 are keyed to rotate with the shaft 28 by means of a key 40. Stripping plates 42 are placed between each two adjacent rings 36 and extend below the rings 36 and are adapted to engage the frame of the machine as indicated in Figure 1, upon rotation of the roller 22. The stripping plates 42 are of a thickness so as not to bind between the plates 36, and have central openings large enough to permit free rotation of the roller when the plates 42 are held against rotation.

The rings 36 are provided with a plurality of teeth 44 around their circumference, which are adapted to engage the skin of the pork pieces in the skin pulling operation.

A concave shoe indicated generally at 46 cooperates with the roller 22 to form the skin pulling means. The shoe 46 has a concave surface 48 on the side thereof adjacent the roller 22 and is of a curvature to conform with the circumference of the roller 22. The opposite end of the shoe 46 is in the form of a weight 50. The upper portion of the shoe 46 is provided with a cut-out portion 52 in which is fitted a skinning blade 54, the blade 54 being secured in place by a top element 56 which is secured to the main body of the shoe 46 by screws 58 (Figure 2). The skinning blade 54 extends beyond the shoe 46 and top element 56 in a direction extending over the top of the roller 22, and such extended edge is provided with a knife edge 60 for directly skinning the piece of meat. The ends of the top element 56 are provided with trunnions 62 pivotally supported in bearings in arms 64. The trunnions 62 are disposed generally between the concave surface 48 and the weighted portion 50, and being formed on the top element 56 are disposed at the top of the shoe 46. Such position of the trunnions 62 serves to support the shoe 46 in positions to be described later.

The arms 64 are disposed one on each side of the machine, and are pivoted at 66 in the side plates 20 of the machine. The shape of the arms 64 is such that the trunnions 62 are disposed generally above the pivot points 66. The arms 64 extend out beyond the ends of the side plates 20 of the machine and have pivoted therein, as indicated at 68, treadle rods 70 extending downwardly toward the bottom of the machine.

A plate or table 72 is secured in the machine in position for feeding pieces to be skinned to the roller 22. The plate 72 is fitted in grooves 74 formed on the inner sides of the side plates 20 and held therein as by screws 76. The plate 72 extends out the front of the machine a sufficient distance to support the usual sizes of the pieces to be skinned, such as backs, bellies, smoked bacons, etc.

A shaft 78, which may be square in cross section, is fitted in the side plates 20 at the top thereof. The ends of the shaft 78 may be rounded and fitted in bushings 80 in the side plates 20. A plurality of hold down fingers 82 are secured on the shaft 78 at closely spaced intervals along the shaft (Figure 2). The ends of the fingers 82 extend over the roller 22 and are adapted to be brought down toward the roller 22. The outer ends of the fingers 82 are curved slightly upwardly as indicated in Figure 1. A piece of meat to be skinned is indicated at 84 resting on the table 72 and in position for the skinning operation to begin. The piece 84 is placed on the table 72 with the skin or rind down.

One end of the shaft 78 extends out through the respective side plate 20 as shown at 86, and fitted on the extension 86 is a forked arm 88. Pivoted in the extended end of the forked arm 88 is a second treadle rod 90 extending to the bottom of the machine.

The mechanism for controlling the hold down attachment and the skin pulling means includes a rock shaft 92 pivoted in the cross pieces 94 forming part of the frame work of the machine (Figures 1 and 5). Secured between the lower ends of the treadle rods 70 for the skin pulling means is a cross bar 96. Extending downwardly from the cross bar 96 are a pair of yoke members 98 having a pin 100 extending therebetween. An arm 102 rigidly secured to the shaft 92 extends between the members 98 and is provided with an arcuate slot 104 through which the pin 100 is fitted.

A cam member 106, having a downwardly extending cam arm 108, is secured to one end of the rock shaft 92. The camming surface of the cam arm 108 includes an indented portion 110 and a raised portion 112 having a greater radial extension than the portion 110. The lower end of the treadle rod 90 for the hold down attachment is provided with a yoke member 114 in which is journalled a roller 116. The yoke member 114 has a member disposed on each side of the cam arm 108 for retention of the yoke member on the cam member. The lower end of the yoke member 114 is provided with a reduced portion as indicated at 118 which extends through cross member 120 forming a part of the frame of the machine. A compression spring 122 encircles the reduced portion 118 and is biased between the yoke member 114 and the structural member 120. A treadle arm 124 is also secured to the rock shaft 92 and extends laterally out of the machine, for convenience of the operator.

Another arm 126 is fixedly secured to the rock shaft 92 and extends upwardly. A tension spring 128 is secured between the upper end of the arm 126 and a cross member of the frame of the machine. The spring 128 biases the arm 126 and the shaft 92 clockwise as viewed in Figure 1.

The device of Figures 8 and 9 may be compared with the machine just described, in so far as the operation of the skinning process is concerned. Figures 8 and 9 show various of the elements diagrammatically. The machine includes a frame element 130 mounted on the top of the frame structure. Side plates 132 are formed on the frame structure and in the side plates 132 is journalled a skinning roller 134. Cooperating with the skinning roller 134 is a shoe 136. The construction and operation of the skinning roller 134 and shoe 136 in the present instance are similar to that of the device of Figures 1 to 7. However, in the present case the shoe 136 is pivoted at 138 in arms 140. The arms 140 are pivoted at 142 in the side plates 132, and are generally in the shape of an L. The short legs of the arms 140 extend upwardly and then over the top of the machine where the extended ends 144 reach out toward the opposite end of the side plates. A treadle rod 146 having a releasable yoke connection 148 with the extended ends 144 of the arms 140, extends toward the bottom of the machine where a treadle member such as treadle member 124 of the previous form is provided for actuation of the arms 140. A compression spring may be provided for biasing the treadle rod 146 and arms 140 upwardly.

Supported on each side plate 132 is an upwardly extending side member 150. The side members 150 extend upwardly beyond the arms 140 wherein is journalled a shaft 152 similar to the shaft 78. Secured in the shaft 152 are a plurality of hold down fingers 154 having their outer ends curved upwardly. The outer ends of the fingers 154 extend over the roller 134 and are adapted to be brought downwardly toward the roller 134, as will be described.

An arm 156 is provided at each end of the shaft 152 and secured to the outer end of each arm 156 is a link 158 the other end of which is secured in the respective operating arm 140. A piece to be skinned is indicated at 160.

Use and operation

Figure 1 shows the skinning machine in the neutral or inoperative position. The hold down fingers 82 are in raised position and the shoe 46 is out of engagement with the roller 22. When a piece of meat, such as indicated at 84, is placed on the table 72 for skinning, the operator depresses the treadle member 124 to the position shown in Figure 3. This movement of the treadle rotates the cam member 106 counter-clockwise, and the roller 116 in the lower end of the treadle rod 99 rides up on the camming surface 112. This action lowers the treadle rod 90 and rotates the shaft 78 clockwise bringing the extended ends of the hold down fingers 82 down into engagement with the slab of meat 84. The fingers 82 may be somewhat flexible to accommodate lost motion while still retaining the slab of meat in flattened position.

During this initial depressing movement of the treadle 124 the arm 102 is also rotated counter-clockwise. The slot 104 in the arm 102 slides over the pin 100 in the lower end of the treadle rod 70. This movement of the arm 102 is just sufficient for the full length of the slot to slide over the pin and no upward movement of the treadle rod 70 takes place. Upon further depression of the treadle 124 to the position shown in Figure 4, the treadle rod 70 is raised, this action swinging arms 64 in their pivots 66 and bringing the shoe 46 to the left, into operative relation with respect to the roller 22. During the second portion of the depressing action of the treadle 124 the camming surface 112 has no further effect on the treadle rod 90 and accordingly this latter rod remains stationary and the hold down fingers 82 remain in engagement with the slab of meat.

When the operator releases the treadle 124 the spring 128 rotates the arm 126 clockwise, which rotates the rock shaft 92. This action rotates the arm 102 clockwise, lowering the treadle rod 70 and bringing the shoe 46 out of operative relation with respect to the roller 22. The same action of rotating the rock shaft 92 swings the cam member 106 to the left bringing the indented cam surface 110 to a position where the spring 122 raises the treadle rod 90 and thereby lifts the hold down fingers 82 upwardly.

Further details of the action of the roller 22 and shoe 46 in pulling the skin from the meat may be observed in my two previous pending applications identified above. Suffice it to say here that the roller 22 cooperates with the concave surface 48 of the shoe 46 to pull the skin from the meat, the knife 54 serving to part the skin from the meat.

The weighted portion 50 of the shoe 46 tends to rotate the shoe 46 clockwise so that when the shoe is brought away from the roller 22 the cutting edge of the blade 54 is raised away from the roller, as illustrated in Figure 1. At the same time the lower edge of the concave surface 48 remains in engagement with the rings 26, and when the shoe 46 is brought to the left toward the roller, the contact of the lower edge of the concave surface rotates the shoe counter-clockwise, bringing the concave surface of the shoe toward the roller.

The rings 26 at the ends of the roller 22 are larger in diameter than the toothed rings 36. The shoe 46 extends beyond the ends of the roller and comes into contact with the rings 26 which prevents the shoe or the knife 54 from clashing with the teeth of the roller. The rings 26 need be only slightly larger than the roller because for all practical purposes the teeth of the rings 36 are nearly in engagement with the concave surface of the shoe.

The device of Figures 8 and 9 is designed for application to a skinning machine which was not originally provided with a hold down attachment. Figure 8 shows the arms 140 elevated, whereby the shoe 136 is held away from the roller 134. When the operator depresses the treadle, the arms 140 are rotated counter-clockwise. This action, through the links 158, swings the arm 156 and the hold down fingers 154 downwardly. The lowermost position of the arms 140 and of the hold down fingers 154 is shown in the Figure 9. In the present device, one movement of the treadle member by the operator simultaneously brings the shoe 136 into operative position and brings the hold down fingers 154 into operative position.

While I have herein shown and described certain preferred embodiments of my invention, manifestly it is susceptible of modification and rearrangement of the parts without departing from the spirit and scope thereof. I do not therefore wish to be understood as limiting my invention to the precise forms herein disclosed, except as I may be so limited by the appended claims.

I claim as my invention:

1. In a skinning machine, a frame, a roller mounted on the frame, a pressure shoe cooperating with said roller to form a skinning means therewith, said pressure shoe adapted to be brought into and out of operative relation with respect to said roller, treadle means, lost motion connection between said pressure shoe and said treadle means, a table for supporting an object to be skinned in position for feeding the skin from the object between said roller and pressure shoe, a rock shaft mounted above said table, a plurality of fingers on said rock shaft and extending toward said skinning means, said fingers adapted on rocking of said rock shaft to have their extended ends biased toward said table adjacent said skinning means, arms extending from said rock shaft, and links interconnecting said arms and said treadle means, said treadle means on initial actuation thereof being operable to rock said rock shaft and bias said fingers toward said table and on continued actuation to bring said pressure shoe into operative relation with respect to said roller.

2. In a skinning machine, a frame, a roller mounted on the frame, a movable pressure shoe cooperable with said roller to form a skinning means therewith, a treadle shaft and treadle, lost motion connection between said pressure shoe and said treadle, a table for supporting an object to be skinned in position for feeding the skin from the object between said roller and pressure shoe hold down means supported above said table, said hold down means adapted to be biased toward said table, cam means on said treadle shaft, and links interconnecting said hold down means and said cam means, said cam means being rotated on actuation of said treadle and operating through said links for biasing said hold down means toward said table, and said treadle being operable to bring said pressure shoe into operative relation with respect to said roller.

3. In a skinning machine, a frame, a roller mounted on the frame, a movable pressure shoe cooperable with said roller to form a skinning means therewith, a treadle shaft and treadle, lost motion connection between said pressure shoe and said treadle, a table for supporting an object to be skinned in position for feeding the skin from the object between said roller and pressure shoe hold down means supported above said table, said hold down means adapted to be biased toward said table, cam means on said treadle shaft, and links interconnecting said hold down means and said cam means, said treadle on initial actuation thereof rotating said cam means and thereby operating through said links for biasing said hold down means toward said table, and on continued actuation being operable to bring said pressure shoe into operative relation with respect to said roller.

4. In a skinning machine, a frame, skinning means for severing and pulling the skin from an object to be skinned, said means having a line-opening for receiving the skin, a table for supporting the object in position for feeding the skin to said skinning means, a rock shaft supported above said table, a plurality of fingers on said rock shaft and normally extending toward said skinning means, the extended ends of said fingers on rocking of said rock shaft adapted to be biased toward said table adjacent said skinning means, arms on said rock shaft, treadle and cam means mounted on the frame, links interconnecting said arms and said cam means, a lost motion connection between said treadle and said skinning means, said treadle, acting through said cam means and links, being operable for sequentially rocking said rock shaft for biasing said fingers toward said table and moving said skinning means to skin severing position.

5. In a skinning machine, a frame, skinning means adapted to be brought into and out of operating condition, said skinning means being adapted to sever and pull the skin from an object to be skinned, said skinning means having a line-opening for receiving the skin, a table for supporting the object in position for feeding the skin to said skinning means, hold down means supported above said table and adapted to be biased toward said table, treadle and cam means, links interconnecting said hold down means and cam means, and lost motion connection between said skinning means and said treadle, said treadle on initial actuation being operable to bias said hold down means toward said table and on continued actuation to bring said skinning means into operating condition.

6. In a skinning machine, a frame, skinning means adapted to be brought into and out of operating condition, said skinning means being adapted to sever and pull the skin from an object to be skinned, said skinning means having a line-opening for receiving the skin, a table for supporting the object in position for feeding the skin to said skinning means, hold down means supported above said table and adapted to be biased toward said table, treadle means, first links interconnecting said skinning means and said treadle means and including a lost-motion connection, and second links interconnecting said hold down means and said treadle means, said treadle means on being depressed first drawing downwardly on said second links for biasing said hold down means toward said table, and thereafter forcing said first links upwardly for bringing said skinning means into operating condition.

7. In a skinning machine, a frame, skinning means adapted to be brought into and out of operating condition, said skinning means being adapted to sever and pull the skin from an object to be skinned, said skinning means having a line-opening for receiving the skin, a table for supporting the object in position for feeding the skin to said skinning means, hold down means supported above said table and adapted to be biased toward said table, treadle and cam means, first links operably connected to said skinning means, said first links having a pin in their extended ends, said treadle means having a slot in which said pin is operable, and second links interconnecting said hold down means and said cam means, said treadle means on being initially depressed acting through said cam means and drawing downwardly on said second links for biasing said hold down means toward said table, and on continued depressing acting through said pin and slot and forcing said first links upwardly for bringing said skinning means into operating condition.

8. In a skinning machine, a frame, a roller mounted on said frame, arms pivotally mounted on said frame, a pressure shoe pivoted on said arms, said pressure shoe, on swinging said arms being movable into and out of operative relation with respect to said roller, said pressure shoe having a skinning knife and counterbalance weight on opposite sides of the pivot point of the pressure shoe, and actuating means operably connected with said pivoted arms, said counterbalance weight normally biasing said pressure shoe about its pivot and bringing said shoe out of operative relation with respect to said roller, and said actuating means being operable on actuation thereof to swing said arms and bring said pressure shoe into operative relation with respect to said roller.

RAY THEODORE TOWNSEND.

REFERENCES CITED

The following references are of record in the file of this patent:

UNITED STATES PATENTS

| Number | Name | Date |
|---|---|---|
| 318,101 | Gerber | May 19, 1885 |
| 1,350,096 | Fisher | Aug. 17, 1920 |
| 1,376,810 | Hieatzman | May 3, 1921 |
| 1,516,678 | Morrison | Nov. 25, 1924 |
| 1,703,217 | Watson | Feb. 26, 1929 |
| 1,878,457 | Berry | Sept. 20, 1932 |
| 2,254,969 | Lindsey | Sept. 2, 1941 |
| 2,315,767 | Brustowsky | Apr. 6, 1943 |

FOREIGN PATENTS

| Number | Country | Date |
|---|---|---|
| 32,067 | Austria | Mar. 10, 1908 |